United States Patent [19]

Durrieu et al.

[11] Patent Number: 5,154,857
[45] Date of Patent: Oct. 13, 1992

[54] DEMULSIFYING AND ANTIFOULING AGENT SUITABLE FOR SEPARATING POSSIBLY EMULSIFIED WATER/HYDROCARBON MIXTURES

[75] Inventors: Marc Durrieu, La Havre; Patrice Herrenschmidt, Le Pecq; Claude Marty, Le Havre, all of France

[73] Assignee: Compagnie de Raffinage et de Distribution Total France, Levallois-Perret, France

[21] Appl. No.: 744,668

[22] Filed: Aug. 9, 1991

Related U.S. Application Data

[60] Continuation of Ser. No. 372,123, Jun. 27, 1989, abandoned, which is a division of Ser. No. 145,227, Jan. 19, 1988, abandoned.

[30] Foreign Application Priority Data

Jan. 16, 1987 [FR] France .................... 87 00454

[51] Int. Cl.$^5$ .................... B01D 17/05; C10G 33/04
[52] U.S. Cl. .................... 252/338; 252/344; 252/358; 208/188; 208/289; 210/708
[58] Field of Search .............. 208/289, 188; 210/708; 252/338, 344, 358; 564/505

[56] References Cited

U.S. PATENT DOCUMENTS

| | | | |
|---|---|---|---|
| 2,050,924 | 8/1936 | De Groote | 252/344 |
| 3,205,169 | 9/1965 | Kirkpatrick | 252/8.553 |
| 3,835,060 | 9/1974 | Maddox, Jr. et al. | 252/358 X |
| 3,907,701 | 9/1975 | Liebold et al. | 252/344 |
| 4,200,550 | 4/1980 | Scherrer et al. | 252/335 |
| 4,209,422 | 6/1980 | Zimmerman et al. | 252/344 |
| 4,222,853 | 9/1980 | Scherrer et al. | 235/84 |
| 4,269,271 | 5/1981 | Shupe et al. | 166/274 |
| 4,374,734 | 2/1983 | Newcombe | 210/708 |
| 4,474,682 | 10/1984 | Billenstein et al. | 252/344 |
| 4,537,701 | 8/1985 | Oppenlaender et al. | 210/708 X |
| 4,961,858 | 10/1990 | Spei et al. | 210/708 |
| 4,981,569 | 1/1991 | Schugerl et al. | 219/708 X |
| 4,992,210 | 2/1991 | Naeger et al. | 208/289 X |

FOREIGN PATENT DOCUMENTS

| | | | |
|---|---|---|---|
| 0078489 | 11/1983 | European Pat. Off. | |
| 0277060 | 3/1988 | European Pat. Off. | |
| 1280526 | 4/1963 | France | 208/188 |
| 263795 | 2/1970 | U.S.S.R. | 208/188 |
| 346946 | 6/1974 | U.S.S.R. | 208/188 |
| 447427 | 1/1980 | U.S.S.R. | 208/188 |

Primary Examiner—Robert L. Stoll
Assistant Examiner—Gary L. Geist
Attorney, Agent, or Firm—A. Thomas Safford

[57] ABSTRACT

The invention relates to a water-soluble demulsifying and antifouling agent capable of separating possibly emulsified water/hydrocarbon mixtures, and particularly water/crude petroleum mixtures containing suspended matter.

Said agent comprises from 10 to 60 percent by weight of a combination of the following compounds:
  at least one quaternary tetraalkylammonium halide; and
  at least one polyalkyloxylated alkylenediamine or its sulfate.

12 Claims, No Drawings

DEMULSIFYING AND ANTIFOULING AGENT SUITABLE FOR SEPARATING POSSIBLY EMULSIFIED WATER/HYDROCARBON MIXTURES

This application is a continuation of application Ser. No. 372,123, filed June 27, 1989, now abandoned, which is a division of prior copending application Ser. No. 145,227, filed Jan. 19, 1988 (now abandoned).

This application corresponds to French Patent application Ser. No. 8700454, filed Jan. 16, 1987, published Jul. 27, 1988, Publication No. 2 609 648, the French text of which is incorporated herein by reference.

The present invention relates to demulsifying and antifouling agents suitable for separating possibly water/hydrocarbon mixtures, and particularly water/crude petroleum mixtures containing sediments. The invention further relates to the use of these demulsifying agents in the extraction of salts and suspended matter contained in crude petroleums during the desalting and/or dehydration operations in petroleum-producing fields or in the refinery prior to any other refining operation.

Hereinafter, the term "suspended matter" will be applied to any solid in the particulate state present in the crude petroleum, and in particular to mineral sediments, iron salts, carbenes and asphaltenes.

As is known, salts and suspended matter are present in crude petroleums in varying concentrations, depending on the area where they originated. The salts present are the cause of corrosion observed in the production, transportation or refining of these crude petroleums, while the suspended matter often exerts a stabilizing action on water/hydrocarbon emulsions, and particularly on water/crude petroleum emulsions, in the desalting and dehydration operations, first in the producing field, then in the refinery.

In a field producing heavy oils, removal of the sediments is very difficult if not impossible. Costly techniques such as centrifugation, which increase the cost of producing and then of refining the extracted hydrocarbons, are generally employed. The problem is to find a way of eliminating these sediments with a view to obtaining hydrocarbons of a quality at least as good, and even better, in the most economical manner.

When the suspended matter remaining in the crude petroleum is only partially removed in the desalting and dehydration operations in the refinery, more severe fouling of the heat exchangers located ahead of the atmospheric distillation unit is observed. Moreover, if the salt content of the crude petroleum is too high at the outlet of the desalting vessel, there is the risk of corrosion at the top of the atmospheric distillation tower. To limit this corrosion, an amount of soda that is proportionate to the amount of the salts contained in the feedstock is usually introduced into the latter after the desalter, which has a deleterious effect on the quality of certain refined products and on the proper performance of the subsequent refining operations. In fact, the sodium so introduced into an atmospheric distillation feedstock is concentrated in the atmospheric residue and subsequently promotes coke formation in the process furnaces, poisons the catalysts of the conversion units (and particularly of the catalytic cracking unit when atmospheric residues carrying sodium are being treated), and degrades the quality of heavy fuel oils. For all these reasons, it is preferable to reduce the amount of sodium injected into an atmospheric distillation feedstock while improving the desalting and dehydration of the hydrocarbons.

The dehydration and desalting operations in a producing field and in the refinery consist in decanting and/or desalting the water/crude petroleum emulsions, formed naturally or artificially, by washing with water. The water content of these emulsions ranges from 0 to 50 percent by weight of the emulsion. The breaking of the emulsion results in the formation of a "water phase" carrying salts and suspended matter, and of a "crude phase" containing the hydrocarbons, the salts and the residual suspended matter. This separation is carried out reasonably well in a decanter and can be improved, especially by the application in the decanter of one or more high-potential electrostatic fields to bring about a more rapid coalescing of the water droplets.

It is during these operations that at the interface of the "water phase" and the "crude phase" an emulsion forms which is called interface emulsion and which is often stable, this stability being due to the presence of suspended matter.

To accelerate and improve the coalescence of the water droplets and the extraction of the suspended matter from the crude petroleum during the desalting and/or dehydration operations, it is customary to add to the crude and/or to the wash water prior to their entering the decanter at least one demulsifying agent. It is also known to introduce a second demulsifying agent having antifouling power into the interface emulsion of the desalter to destabilize it, as described in Applicants' assignee's French patents 2,388,037 and 2,421,958.

However, these agents, introduced separately or simultaneously, exhibit limited efficiency in the washing and desalting operations used to dehydrate the crude petroleum and to extract the salts and the suspended matter which it contains.

Therefore, it is an object of the present invention to introduce a single additive into the wash water of hydrocarbons, and particularly of crude petroleums.

It is a further object of the invention to provide a novel agent whose antifouling and demulsifying properties are adapted to enhance the effectiveness of desalting and/or dehydration treatments and to decrease the suspended matter content of hydrocarbons so as to limit fouling in the subsequent treatments while maintaining a low hydrocarbon content in the water recovered at the outlet of the decanter.

It is another object of the invention to minimize, by securing better desalting, the corrosion problems encountered during the treating operations in the field or in the refinery, to limit the amounts of soda injected after the desalter, to limit coke deposition in the process furnaces, to reduce the risks of poisoning of the catalysts of conversion units, and to improve the quality of the heavy fuel oils.

The present invention consequently has as a preferred embodiment a demulsifying and antifouling agent which is soluble in water and is capable of separating possibly emulsified water/hydrocarbon mixtures, and particularly water/crude petroleum mixtures containing suspended matter, and which is characterized in that it comprises from 10 to 60 percent by weight of a combination of the following compounds:

(a) at least one quaternary tetraalkylammonium halide of the general formula

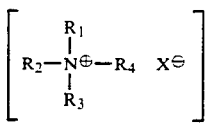

wherein X is a halogen, $R_1$, $R_2$ and $R_3$ are alkyl groups having from 1 to 10 carbon atoms, and $R_4$ is an alkyl group having from 12 to 20 carbon atoms; and (b) at least one polyalkyloxylated alkylenediamine of the general formula

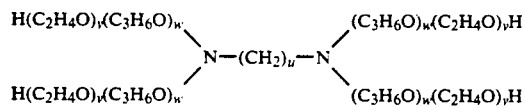

wherein $1 \leq u \leq 4$, $1 \leq v \leq 50$ and $2 \leq w 50$, and preferably $2 \leq v \leq 30$ and $10 \leq w \leq 30$, or its sulfate.

Applicants have found that mixtures of components belonging to each of the two families defined above, optionally with other components, may act, through a synergistic effect, preferentially on the efficiency of dehydration, washing and desalting of a crude petroleum and/or on the extraction of suspended matter contained therein and/or on the quantity of hydrocarbons present in the water recovered after decantation.

Thus, to improve the efficiency of dehydration, washing and desalting of hydrocarbons, and more particularly of crude petroleums, the agent in accordance with the invention may advantageously comprise from 40 to 50 percent by weight of at least one quaternary tetraalkylammonium halide and from 5 to 30 percent by weight of at least one polyalkyloxylated alkylenediamine, as defined in connection with the embodiment of the invention.

To improve the extraction of the suspended matter contained in hydrocarbons, and particularly in crude petroleums, with a high suspended matter content, said agent may comprise from 40 to 10 percent by weight, and preferably from 40 to 10 percent by weight, of at least one quaternary tetraalkylammonium halide and from 5 to 35 percent by weight of at least one polyalkyloxylated alkylenediamine sulfate, as stated above.

The sulfates suitable for use as a component of the inventive agent are obtained, in a manner known to those skilled in the art, by carrying out a sulfation reaction between sulfur trioxide and at least one polyalkyloxylated alkylenediamine, as defined above.

Since sulfation reactions rarely go to completion, the sulfates obtained are not pure but may contain the portion of the base compound which has not reacted with the sulfur trioxide. The inventive agent containing the quaternary tetraalkylammonium halide and a polyalkyloxylated alkylenediamine sulfate may therefore also comprise from 0 to 5 percent by weight of the polyalkyloxylated alkylenediamine from which the sulfate was prepared.

To improve at one and the same time the dehydration, the washing, the desalting, the extraction of suspended matter and the hydrocarbon content of the water at the decanter outlet, the inventive agent preferably comprises from 10 to 40 percent by weight of at least one quaternary tetraalkylammonium halide, from 30 to 5 percent by weight of at least one polyalkyloxylated alkylenediamine, and from 35 to 5 percent by weight of at least one polyalkyloxylated alkylenediamine sulfate, as mentioned above.

The preferred quaternary tetraalkylammonium halide of the invention is a cetyltrimethylammonium halide, and more particularly cetyltrimethylammonium chloride.

The preferred polyalkyloxylated alkylenediamines of the invention belong to the family of the polyalkyloxylated ethylenediamines of the general formula

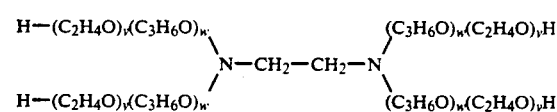

wherein $1 \leq v \leq 50$, and preferably $2 \leq v \leq 30$, and $2 \leq w \leq 50$, and preferably $10 \leq w \leq 30$.

Consequently, the preferred alkylenediamine sulfates of the invention are the polyalkyloxylated ethylenediamine sulfates defined above.

The agent in accordance with the invention may further include in its composition from 90 to 40 percent by weight of an aqueous solvent comprising from 0 to 50 percent by weight of an alcohol selected from the group consisting of alkanols and polyols having from 1 to 10 carbon atoms.

In a preferred embodiment of the invention, the aqueous solvent is pure water containing from 0 to 50 percent by weight of isopropanol.

Each of the demulsifying and antifouling agents of the invention can be used in the desalting and in the dehydration of, crude petroleums in the refinery and in oil fields since they considerably improve the efficiency of dehydration, washing and desalting of hydrocarbons as well as the extraction of suspended matter by comparison with operations without injection of an additive or with injection of one or more known commercial demulsifying or antifouling additives.

The effective concentration of the inventive agent may range from 1 to 50 ppm of active substances, based on the crude petroleum.

Moreover, the inventive demulsifying and antifouling agents can be used in the extraction of matter suspended in high concentration in a heavy oil. In this application, an agent in accordance with the invention is introduced into water, the water is mixed with the hydrocarbons, the water/hydrocarbon mixture is emulsified, the emulsion is caused to penetrate into a decanter and then decanted, a second agent in accordance with the invention being optionally introduced, if necessary, into the stable emulsion in the decanter at the water/hydrocarbon interface Under the action of the first demulsifying agent and of the second, if any, the suspended matter is decanted into the lower portion of the decanter It is collected in the water phase of the decanter and then eliminated therewith. The clean crude petroleum is recovered in the upper portion of the decanter.

In this use, one or more high-potential electrostatic fields are advantageously applied in the decanter to facilitate the coalescing of the water droplets and the rapid removal of the suspended matter.

The examples which follow will serve to illustrate in a non-limiting manner the effectiveness of the agents in accordance with the invention as used in the demulsification of water/hydrocarbon mixtures and in the prevention of fouling of heat exchangers.

EXAMPLE 1

The purpose of this example is to compare on one and the same crude petroleum the washing and desalting efficiencies of the demulsifying and antifouling agents of the invention, designated X, with other, commercial demulsifiers $C_1$ and $C_2$, added individually to the crude phase. Its purpose is further to demonstrate the effectiveness of the agents X in the extraction of suspended matter from hydrocarbons.

The agents $C_1$ and $C_2$ are obtained from a mixture of commercially available substances. They are introduced only into the crude phase.

Agent $C_1$ is a mixture of polyoxyethylated phenolic resins, dissolved in an aromatic solvent. Agent $C_2$ is a combination of polyoxypropylated polyoxyethylated active substances comprising at least phenolic resins, ethylenediamines and block copolymers, these substances being dissolved in an aromatic solvent.

The agents X ($X_1$ to $X_5$) are composed of commercially available active substances, with the exception of those whose composition includes an alkylenediamine sulfate.

These sulfates were prepared batchwise on a pilot scale in a closed microreactor having a capacity of two liters and incorporating a sawtoothed-disk agitator immersed in a bath that was maintained at a constant temperature by means of a thermostat.

A proportioning micropump located upstream permits the continuous introduction of sulfur trioxide in liquid form into the microreactor at a controlled rate. Downstream of the reactor, a series of coolers and of cylinders are located for holding the solvent of the reaction, which here is 1,2-dichloroethane.

The sulfates are obtained by a sulfonation reaction of two commercially available alkyloxylated products, SYNPERONIC T 1302 and T 701, marketed by ICI.

This reaction consists of reacting sulfur trioxide, $SO_3$, diluted from 5 to 25 weight percent in 1,2-dichloroethane (DCE), with 1,000 g of a feed consisting of one of the aforesaid commercially available products, diluted to 80 weight percent in DCE.

TABLE 1

| Demulsify-ing and antifoul-ing agent | Composition of active substance | | | Solvent content %*** |
|---|---|---|---|---|
| | CTAC* Wt. % | DA** Wt. % | DA** sulfate Wt. % | |
| $X_1$ | 30 | — | — | 70 |
| $X_2$ | — | — | 30 | 70 |
| $X_3$ | — | 30 | — | 70 |
| $X_4$ | 30 | 10 | — | 60 |
| $X_5$ | 15 | — | 15 | 70 |

*CTAC = Active Substance (cetyltrimethylammonium chloride) contained in ARQUAD 16/29 or ARQUAD 16/50, marketed by AKZO Chemie. The index 16 indicates the number of carbon atoms in the cetyl radical. The index 29 or 50 indicates the ratio (in weight) of the active material in the solvent (water + isopropanol).
**DA (ethylenediamine) = SYNPERONIC T 1302 ($X_4$, $X_7$, $X_8$) or SYNPERONIC T 803 ($X_6$), marketed by ICI. SYNPERONIC T 1302, T 701 and T 803 are all ethylenediamine derivatives which differ from one another by their molecular weight and oxyethylene ratio, as described in their technical notice, as follows: (a) T 1302 - the molecular weight of the polyoxypropylene hydrophobic radical is between 5,500-6,000 and the ratio of the polyoxyethylene hydrophilic radical to the total molecular weight is 20%; (b) T 701 - the molecular weight of the polyoxypropylene hydrophobic radical is between 2,500-3,000 and the ratio of the polyoxyethylene hydrophilic radical to the total molecular weight is 10%; and (c) T 803 - the molecular weight of the polyoxypropylene hydrophobic radical is between 3,000-3,500 and the ratio of the polyoxyethylene hydrophilic radical to the total molecular weight is 30%.
***90% $H_2O$ + 10% (isopropanol), allowing for the solvents in ARQUAD 16/50 and ARQUAD 16/29.

The operation conditions of the sulfation pilot unit are as follows:

| Feed rate of $SO_3$ in DCE: | 1,100 ml/hr. (980-1,170 ml/hr.) |
|---|---|
| Molar ratio of $SO_3$/feed stock: | $\leq 1$ |
| Reactor temperature | $\leq 45°$ C. |
| Temperature of $SO_3$ | Ambient |
| Agitiation speed | 1,200 rpm |
| Contact time | About 30 min. |

At the end of the reaction, the reaction mixture is neutralized with 25% ammonia in water. The water phase containing the inorganic salts of the ammonium sulfate type is withdrawn after decantation of the organic phase consisting of the organic sulfates and the DCE solvent. This solvent is evaporated from the organic phase at between 45° and 50° C. under vacuum so as to reduce as much as possible the degree of hydrolysis of the organic sulfates so obtained. It should be noted that these sulfates are not pure products that are free of the commercial products from which they were derived.

To measure their efficiencies in washing and desalting a crude petroleum, these agents X as well as the commercial demulsifiers were tested in the laboratory in a pilot desalter comprising in particular a mixing valve for emulsification of the water and crude petroleum, and a miniaturized conventional so-called two-electrode electrostatic desalter/decanter.

The crude petroleum is a 20/80 blend of Maya and Brent crudes with a specific gravity d of 0.845.

The operating conditions of the pilot unit are as follows:

| Feed rate of crude petroleum: of a feedstock containing 130 ppm of salts | 3 liters/hour |
|---|---|
| Pressure drop at level of mixing valve: | 1.5 bar |
| Desalter temperature: | 140° C. |
| Primary electric field: | 800 volts/cm |
| Secondary electric field: | 200 volts/cm |
| Desalting water: | 8 weight percent, based on crude |

The proportion of the additive is adjusted to give 7.5 ppm of active substance, based on the crude.

The additive is injected either into the feedstock (B) or into the desalting water (E). Half of the desalting water is injected into the suction line of the crude-petroleum charge pump, and half ahead of the mixing valve.

Every hour, a sample of the crude petroleum is taken at the desalter outlet, and all of the water withdrawn from the desalter is collected.

On these samples, the following measurements are made:

On the crude petroleum feedstock and on the desalted crude petroleum: The water, salt and suspended-matter contents.

On the water withdrawn from the desalter/decanter: The hydrocarbon and chloride contents, the pH, and the extracted suspended matter.

The duration of a test is eight hours: Three hours for start-up and five hours for measurements.

The results of these tests are presented in Table 2 which follows.

These results demonstrate the superiority of the inventive agents, introduced into the water, to the existing commercially available additive, introduced into the crude petroleum, since the desalting and washing efficiencies of the inventive agents are better than those obtained with the additives $C_1$ and $C_2$. The suspended-matter extractive power of the agents X is also greater. The hydrocarbon contents of the water collected at the desalter outlet with the agents X are at the most equal to if not lower than those with the agents $C_1$ and $C_2$.

TABLE 2

| Nature of agent | Desalting % | Washing % | Suspended matter removed % | Hydrocarbons $H_2O$ ppm |
|---|---|---|---|---|
| $C_1$ (B) | 77 | 73 | 38 | 170 |
| $C_2$ (B) | 76 | 76 | 20 | 270 |
| $X_1$ (E) | 92 | 94 | 81 | 185 |
| $X_2$ (E) | 85.4 | 86 | 76 | 200 |
| $X_3$ (E) | 85 | 83 | 81 | 230 |
| $X_4$ (E) | 92 | 98 | 60 | 110 |
| $X_5$ (E) | 78 | 83 | 93 | 200 |

(E) = Introduced into the water
(B) = Introduced into the crude petroleum

Table 2 further shows that the mixture of active substances, CTAC and ethylenediamines, improves the crude-petroleum desalting and washing efficiencies, and that the DA sulfate/CTAC mixture ($X_5$) promotes the extraction of suspended matter from the crude petroleum.

EXAMPLE 2

This example is intended to demonstrate the superiority of the agents X to the commercial additives $C_1$ and $C_2$ so far as fouling is concerned.

Fouling tests were run in a pilot unit with a crude-petroleum blend (Maya/Brent, 20/80) which had first been desalted with agent $X_4$ or with one of the additives $C_1$ and $C_2$. The pilot unit comprises in particular a reactor which is electrically heated in such a way that its walls are maintained at a constant temperature of about 280° C. The fouling is evaluated on the basis of the drop in temperature, expressed in ° C./hr, of the crude petroleum at the reactor outlet.

The results obtained are presented in Table 3 below.

TABLE 3

| Nature of agent | Suspended matter extracted % | Suspended matter/feedstock ppm | Fouling °C./hr. |
|---|---|---|---|
| $C_1$ (B) | 38 | 250 | 1 |
| $C_2$ (B) | 20 | 325 | 1.5 |
| $X_4$ (E) | 81 | 135 | 0 |

(B) = Introduced into the crude petroleum
(E) = Introduced into the water

It is apparent from Table 3 that the more suspended matter is extracted, the less fouling is observed. Agent $X_4$ in accordance with the invention, introduced into the "water phase", is more effective with respect to fouling that the commercial demulsifiers $C_1$ and $C_2$, introduced into the "crude phase".

We claim:

1. A method for extracting suspended solid matter contained in crude petroleum which comprises:
    a. introducing into a wash water an effective amount of a water-soluble agent for demulsifying and anit-fouling a water/hydrocarbon mixture, said agent comprising
    i. from about 10 to about 60 percent by weight, based on the weight of said agent, of
        (1) a combination consisting essentially of
            (a) from about 5 to about 40 percent, based on the weight of said agent, of at least one quaternary tetraalkylammonium halide of the formula

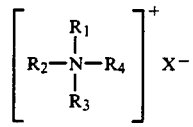

wherein
            X is halogen,
            $R_1$, $R_2$ and $R_3$ are alkyl groups having from 1 to 10 carbon atoms and
            $R_4$ is an alkyl group having from 12 to 20 carbon atoms and
            (b) from about 5 to about 30 percent by weight, based on the weight of said agent, of at least one polyalkoxylated alkylenediamine of the formula

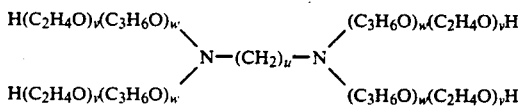

wherein
            $1 \leq u \leq 4$,
            $1 \leq v \leq 50$ and
            $2 \leq w \leq 50$ or
        (2) a combination consisting essentially of
            (a) from about 5 to about 40 percent by weight, based on the weight of said agent, of at least one quaternary tetraalkylammonium halide of said formula and
            (b) from about 5 to about 35 percent by weight, based on the weight of said agent, of at least one sulfate of a polyalkoxylated alkylenediamine of said formula or
        (3) a combination consisting essentially of
            (a) from about 5 to about 40 percent by weight, based on the weight of said agent, of at least one quaternary tetraalkylammonium halide of said formula,
            (b) from a trace to about 30 percent by weight, based on the weight of said agent, of at least one polyalkoxylated diamine of said formula and
            (c) from about 5 to about 35 percent by weight based on the weight of said agent, of at least one sulfate of a polyalkoxylated diamine of said formula and
    ii. from about 90 to about 40 percent, based on the weight of said agent, of an aqueous solvent containing from 0 up to about 50 percent by weight, based on the weight of said agent, of an alcohol selected from the group consisting of alkanols and polyols having from 1 to 10 carbon atoms;
    b. mixing the agent-containing wash water with the crude petroleum;
    c. emulsifying the mixture of agent-containing wash water and crude petroleum;
    d. introducing the emulsion into a decanting zone;

e. separating said emulsion in said decanting zone into a water phase containing solid material and an oil phase;

f. collecting and discharging the solid matter and g. recovering the thus-treated crude petroleum.

2. A method for extracting suspended solid matter as defined in claim 1 wherein said combination consists essentially of
   (a) from about 5 to about 40 percent, based on the weight of said agent, of at least one quaternary tetraalkylammonium halide of said formula and
   (b) from about 5 to about 30 percent by weight, based on the weight of said agent, of at least one polyalkoxylated alkylenediamine of said formula.

3. A method for extracting suspended solid matter as defined in claim 1 wherein said combination consists essentially of
   (a) from about 5 to about 40 percent by weight, based on the weight of said agent, of at least one quaternary tetraalkylammonium halide of said formula and
   (b) from about 5 to about 35 percent by weight, based on the weight of said agent, of at least one sulfate of a polyalkoxylated alkylenediamine of said formula.

4. A method for extracting suspended solid matter as defined in claim 1 wherein said combination consists essentially of
   (a) from about 5 to about 40 percent by weight, based on the weight of said agent, of at least one quaternary tetraalkylammonium halide of said formula,
   (b) from a trace to about 30 percent by weight, based on the weight of said agent, of at least one polyalkoxylated diamine of said formula and
   (c) from about 5 to about 35 percent by weight, based on the weight of said agent, of at least one sulfate of a polyalkoxylated diamine of said formula.

5. A method in accordance with claim 1 wherein the method includes the further step of
   introducing a second agent for demulsifying and antifouling into the decanting zone at the interface between the water phase and the oil phase after step d. and before step e.

6. A method in accordance with claim 5 wherein said second agent is as defined for the agent in step a.

7. A method in accordance with claim 1 wherein said quaternary tetraalkylammonium halide comprises a cetyltrimethylammonium halide.

8. A method in accordance with claim 7 wherein said cetyltrimethylammonium halide comprises cetyltrimethylammonium chloride.

9. A method in accordance with claim 1 wherein
$u=2$,
$2 \leq v \leq 30$ and
$10 \leq v \leq 30$.

10. A method in accordance with claim 1 wherein said alcohol comprises isopropanol.

11. A method in accordance with claim 1 wherein said effective amount ranges from about 1 to about 50 ppm, based on the crude petroleum.

12. A method in accordance with claim 1 wherein said decanter zone comprises an electrostatic decanter.

* * * * *